United States Patent
Bertini et al.

(10) Patent No.: US 9,726,493 B2
(45) Date of Patent: Aug. 8, 2017

(54) SHOCK-ROBUST INTEGRATED MULTI-AXIS MEMS GYROSCOPE

(71) Applicant: Hanking Electronics, Ltd., Canton, OH (US)

(72) Inventors: Lorenzo Bertini, Pisa (IT); Alessandro Rocchi, Rosignano Solvay (IT)

(73) Assignee: Hanking Electronics, Ltd., Solon, OH (US)

( * ) Notice: Subject to any disclaimer, the term of this patent is extended or adjusted under 35 U.S.C. 154(b) by 279 days.

(21) Appl. No.: 14/477,051

(22) Filed: Sep. 4, 2014

(65) Prior Publication Data

US 2015/0330784 A1 Nov. 19, 2015

Related U.S. Application Data

(60) Provisional application No. 61/994,574, filed on May 16, 2014.

(51) Int. Cl.
*G01C 19/5712* (2012.01)
*G01C 19/574* (2012.01)

(52) U.S. Cl.
CPC ....... *G01C 19/574* (2013.01); *G01C 19/5712* (2013.01)

(58) Field of Classification Search
CPC ........................... G01C 19/5712; G01C 19/574
See application file for complete search history.

(56) References Cited

U.S. PATENT DOCUMENTS

| | | | | |
|---|---|---|---|---|
| 5,331,401 A * | 7/1994 | Mark | ................. | G01C 19/664 356/475 |
| 7,100,446 B1 * | 9/2006 | Acar | ................. | G01C 19/5719 73/504.12 |
| 2004/0035204 A1 * | 2/2004 | Durante | ............. | G01C 19/5719 73/504.04 |
| 2011/0154898 A1 * | 6/2011 | Cazzaniga | ......... | G01C 19/5747 73/504.12 |
| 2012/0017678 A1 * | 1/2012 | Rocchi | ............... | G01C 19/5747 73/504.12 |
| 2013/0055811 A1 * | 3/2013 | Kim | .................... | G01C 19/5776 73/504.12 |
| 2014/0208823 A1 * | 7/2014 | Trusov | .................... | G01P 21/00 73/1.38 |
| 2016/0025492 A1 * | 1/2016 | Rocchi | ............... | G01C 19/5712 73/504.08 |

* cited by examiner

*Primary Examiner* — Francis Gray
(74) *Attorney, Agent, or Firm* — Hartman Global IP Law; Gary M. Hartman; Domenica N. S. Hartman

(57) ABSTRACT

Various embodiments of the invention integrate multiple shock-robust single-axis MEMS gyroscopes into a single silicon substrate while avoiding the complexities typically associated with designing a multi-drive control system for shock immune gyroscopes. In certain embodiments of the invention, a shock immune tri-axial MEMS gyroscope is based on a driving scheme that employs rotary joints to distribute driving forces generated by two sets of driving masses to individual sensors, thereby, simplifying the control of the gyroscope.

20 Claims, 4 Drawing Sheets

SHOCK-ROBUST INTEGRATED MULTI-AXIS MEMS GYROSCOPE

CROSS REFERENCE TO RELATED PATENT APPLICATIONS

This application is related to and claims the priority benefit of commonly-assigned U.S. Patent Application Ser. No. 61/994,57, filed on May 16, 2014, titled "Shock Robust Integrated Multi-Axis MEMS Gyroscope," listing inventors Lorenzo Bertini and Alessandro Rocchi, which application is herein incorporated by reference in its entirety.

BACKGROUND

A. Technical Field

The present invention relates to micro-electro-mechanical-system (MEMS) gyroscopes. More particularly the invention relates to MEMS systems, devices, and methods to operate multi-axial MEMS gyroscopes and provide immunity against environmental mechanical disturbances.

B. Background of the Invention

In recent years, the market for MEMS gyroscopes has seen rapid increases in the demand for MEMS gyroscopes designed for applications such as consumer electronics and automotive. As a result, two distinctive trends have crystallized in the development of modern gyroscopes.

First, the trend to miniaturization of gyroscopes has led to designs that integrate multiple MEMS sensors into a single device that is capable of simultaneously sensing angular velocity around multiple spatial axes. An example of multi-axial integration of gyroscopic sensors for low-end devices, where small size is a key design parameter, is presented in U.S. patent application serial number 2011/0094301. Second, immunity to environmental disturbances such as vibrations, shock and other sudden impact of forces has become a key requirement in the high-end gyroscopic device market. An example of a shock-robust gyroscope that is designed to counteract environmental disturbances by electrical and mechanical means is presented in U.S. patent application serial number 2013/0269469.

At a glance, it appears that integrating multi-axial sensors into high-end gyroscopic devices would allow for more sophisticated and demanding applications in the consumer market as well as reduce cost for automotive applications. However, high-end shock-robust gyroscopes are inherently complex devices that incorporate redundant differential structures. A direct integration of a three single-axis high-end gyroscope on the same silicon substrate poses complex challenges that have not been mastered to date. In addition, the increase in complexity of designing a suitable control system has kept the above-mentioned two trends practically distinct thus far.

While some efforts are being undertaken to design stabilization and shock robustness features into MEMS gyroscopes that, for example, could prevent accidents and potentially save lives in safety-related applications, the automotive field continues to rely on independent single-axis high-end gyroscopes integrated at board level. Ideally, these gyroscopes would always remain operative even in scenarios in which disturbing forces from shock events are transmitted to the appropriate sensing circuit of the MEMS gyroscope so as to maintain directional stability by distinguishing between the different contributions of forces that cause displacement of proof masses, detecting unwanted spinning, etc., and taking appropriate corrective action in various shock scenarios.

What is needed are designs that successfully combine the advantages of the two above-mentioned trends to create reliable, shock-robust, multi-axis gyroscopic sensors.

SUMMARY OF THE INVENTION

The disclosed systems and methods provide for an electro-mechanical driving system that allows to drive three individual single-axis gyroscopes with a plurality of driving masses.

In particular, in various embodiments of the invention a mechanical component of a driving system is based on a set of rotary joints that distributes driving forces in a manner such as to adjust the direction of the driving motion in accordance with the needs of a plurality single-axis gyroscopes.

By integrating three single-axis shock-robust gyroscopes into a single silicon substrate, the core design of each gyroscope and, hence, its performance in terms of shock robustness is maintained, while avoiding the complexities typically associated with designing a multi-drive control system for shock immune gyroscopes.

Certain features and advantages of the present invention have been generally described here; however, additional features, advantages, and embodiments presented herein will be apparent to one of ordinary skill in the art in view of the drawings, specification, and claims hereof. Accordingly, it should be understood that the scope of the invention is not limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that this is not intended to limit the scope of the invention to these particular embodiments.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention. In this document the terms "joint" and "rotary joint" refer to any kind of hinge, pivoting means, or coupling mechanics recognized by persons skilled in the art.

Figure 1:
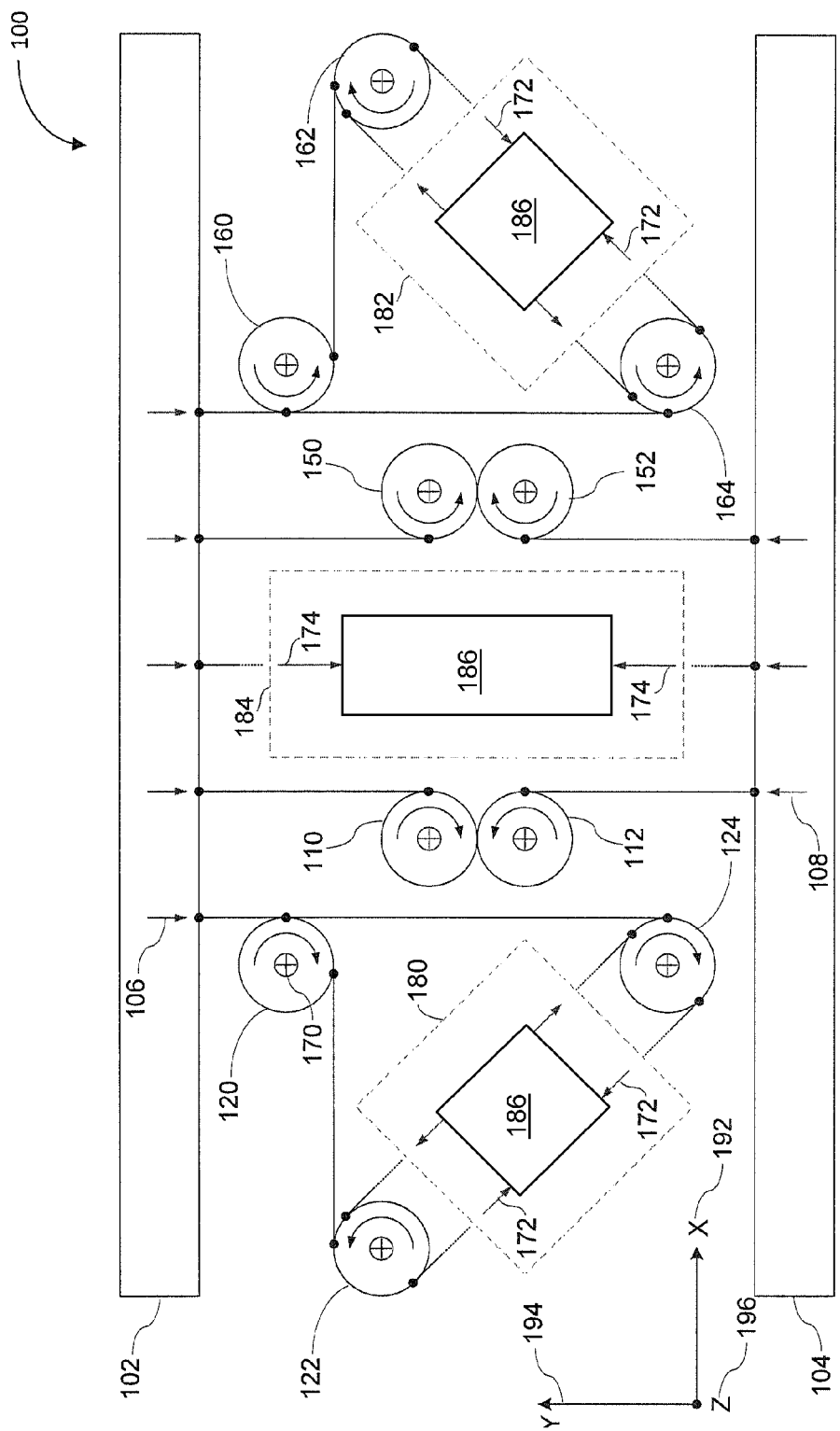
FIG. 1 is an illustration of an exemplary system of shock-robust gyroscopic sensors in a tri-axial gyroscope configuration that is driven by a single driving mechanism, according to various environment of the invention.

FIG. 1 is an illustration of an exemplary system of shock-robust gyroscopic sensors in a tri-axial gyroscope and driven by a single driving mechanism, according to various embodiments of the invention. The system in FIG. 1 combines three individual axial gyroscopes 180-184 within a single device to create tri-axial gyroscope 100. Gyroscope 184 is a Z-gyroscope, while gyroscopes 180 and 182 are two identical in-plane gyroscopes. As shown in FIG. 1, in-plane gyroscopes 180, 182 are oriented placed in a mirror image arrangement to each other across Y-axis 194 and at 45 degree angles to the Y-axis 194 in the X-Y plane.

Gyroscopic sensors 180-184 take advantage of the Coriolis effect to determine when an angular rate is applied to tri-axial gyroscope 100. It is understood that gyroscopic sensors 180-184 comprise internal proof masses (schematically represented at 186) that are displaced by Coriolis forces. Generally, Coriolis forces can be used to measure an angular rate according to the following principle:

Capacitive sense electrodes within each gyroscope measure the displacement of gyro masses in a sense direction orthogonal to the respective driving direction as a capacitive change, which is a function of a rotation of the respective gyroscope. For example, when a Coriolis force acts on the gyroscope 180 in response to an angular velocity applied to tri-axial gyroscope 100, the sense electrodes associated with the proof masses 186 convert the displacement induced by Coriolis force in a capacitive change that is proportional to the applied angular velocity. Typically, an ASIC processes gyroscopic sensor signals in order to determine the angular velocity in relation to the sensor's environment and to adjust the frequency and amplitude required to maintain the harmonic oscillation of the actuator, here, driving masses 102, 104.

In detail, when a mass (e.g., proof mass 186) in a tri-axial gyroscope is driven to move with a certain velocity along a first axis (e.g., X-axis 192) of an orthogonal coordinate system and is exposed to an angular rotation about a second axis (e.g., Z-axis 196), the Coriolis effect typically causes a proof mass 186 to be displaced in a third direction (Y-axis 194) by a Coriolis force that is directly proportional to the angular rate to be measured. Using MEMS technology, this displacement can be detected by appropriate electronics, e.g., by capacitive sensor elements (typically comb electrodes or plate electrodes) to which a voltage is applied to detect variations in position (i.e., a change in capacitance or electric voltage) as a measure of that angular rotation.

In example in FIG. 1, Z-gyroscope 184 is driven along Y-axis 194 and sensitive to deflections along X-axis 192, for rotations about Z-axis 196, i.e., out-of-plane. In-plane gyroscope 180 is driven at a positive 45 degree angle relative to Y-axis 194 and sensitive to deflections along Z-axis 196, for rotations perpendicular to its driving direction in the X-Y plane. Similarly, in-plane gyroscope 182 is driven at a negative 45 degree angle relative to Y-axis 194 and is sensitive to deflections along Z-axis 196 for rotations perpendicular to its driving direction in the X-Y plane.

The driving scheme is facilitated by a set of rotary joints 110, 112, 120, 122, 124, 150, 152, 160, 162, and 164, which includes first and second subsets of rotary joints 120, 122, 124 and 160, 162, and 164 respectively, that by their rotation about Z-axis 196 create push-pull forces that transfer the translational motion of driving masses 102, 104 that takes place in the Y-axis direction 194 to each individual gyroscope 180-184 in the XY-plane. In other words, the set of rotary joints 120-124 and 160-164 distributes the driving force to the proof masses 186 of the individual gyroscopes 180-184. It is noted that without an integrated mechanical system that controls the interaction between driving masses 102, 104 and gyroscopes 180-184, each gyroscope 180-184 would require a separate electrical control loop.

In one embodiment, mechanical excitation for gyroscopes 180-184 is advantageously provided by only a single electrical system comprising drive elements (not shown) that excite both driving masses 102, 104 into harmonic oscillation along a spatial axis, e.g., Y-axis 194. Masses 102, 104 are typically electrostatically actuated by electrodes (not shown) so as to oscillate along Y-axis 194 and deliver mechanical forces to individual gyroscopes 180-184. This substantially simplifies the design of the control system (not shown) that drives and controls driving masses 102, 104. One skilled in the art will appreciate that masses 102, 104 may be implemented in any suitable orientation and geometry.

In example in FIG. 1, each of rotary joint 110-112, 120-124, 150-152, and 160-164 is coupled to either mass 102, 104, gyroscope 180-184, or another one of joint 110-112, 120-124, 150-152, and 160-164 and rotates around its respective central anchoring point 170. One set of joints 110-112 and its symmetrical counterpart 150-152 constrain the motion of driving masses 102, 104 to be synchronous and antiphase.

In detail, when mass 102 moves in negative direction 106 along Y-axis 194, mass 104 moves in positive direction 108 along Y-axis 194. This antiphase motion is suitable to generate forces 174 that directly excite Z-gyroscope 184. Joints 120-124 and 160-164 transform the movement of driving mass 102, 104 along Y-axis 194 into antiphase movements at +/−45 degrees relative to Y-axis 194 in plane X-Y, so as to excite in-plane gyroscopes 180 and 182, respectively. For example, when joint 120 rotates clockwise, the rotary motion is transferred to joints 122 and 124 that then rotate counter-clockwise and clockwise, respectively. This generates forces 172 that actuate in-plane gyroscope 180. Joints 160-164 correspondingly effect in-plane gyroscope 182.

It is understood that the number of locations on joints 122 at which a force may be applied can be adjusted according to the particular implementation. While in some cases this may prevent the use of shock-robust gyroscopes, it still enables operation of the gyroscope in a single-drive tri-axial gyroscope configuration. It is further understood that while gyroscopes 180, 182, due to their mirror-image design in-plane, may be identical, this is not intended as a limitation on the scope of the present invention. One of skill in the art will appreciate that other joint arrangements and orientations for gyroscopes 180, 182 are feasible without deviating from the scope of the invention. Finally, while detailed descriptions of joints and additional anchoring to frames, for example, for driving joints are omitted for brevity and clarity, it is understood that joints 110-112, 120-124, 150-152, and 160-164 may be implemented by any method known in the art.

Figure 2:
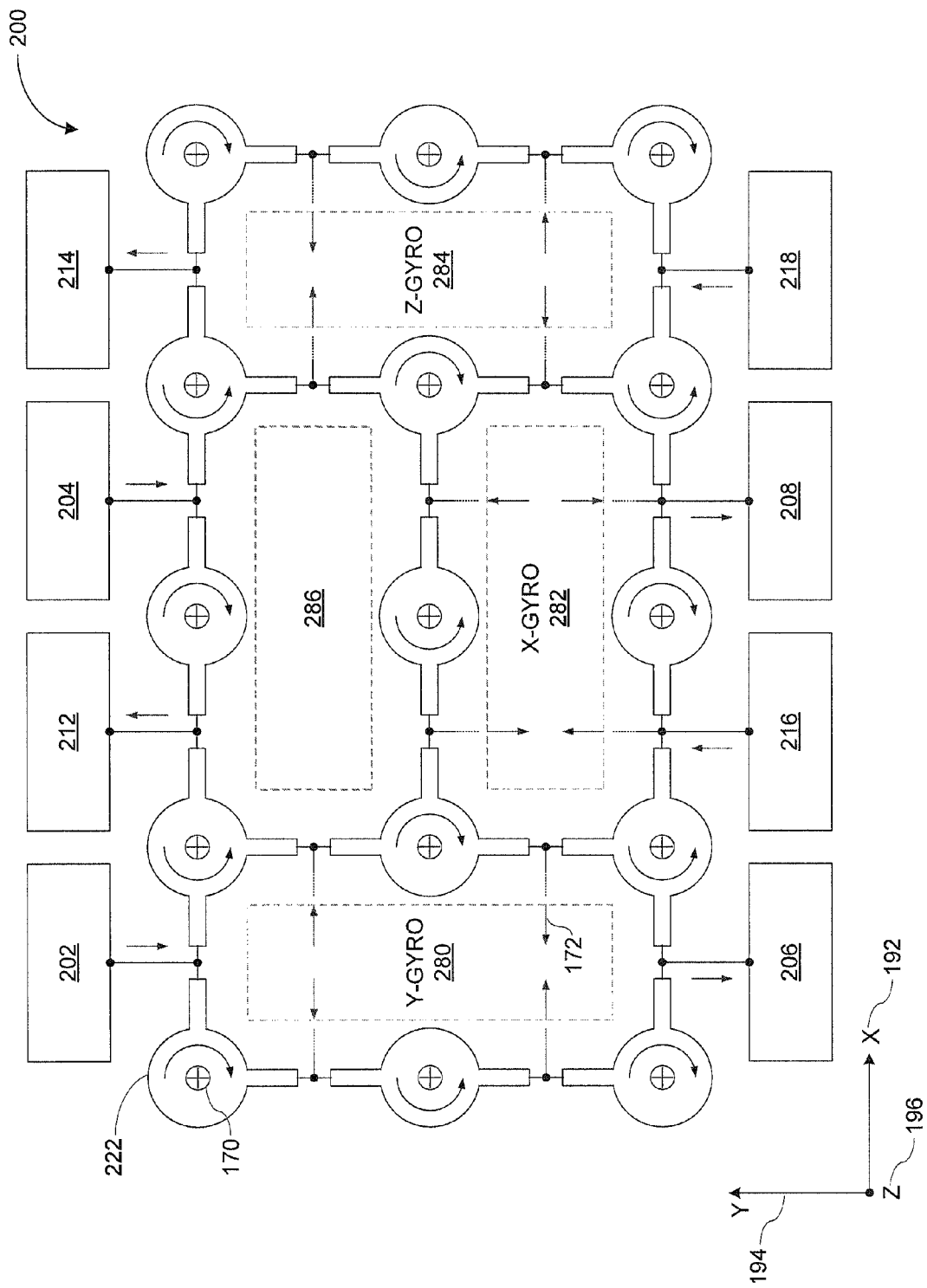
FIG. 2 is an illustration of another exemplary system of shock-robust gyroscopic sensors in a multi-axis gyroscope configuration driven by a single driving mechanism, according to various environment of the invention.

FIG. 2 is an illustration of another exemplary system of shock-robust gyroscopic sensors in a multi-axis gyroscope that is driven by a single driving mechanism, according to various environment of the invention. In a manner similar to FIG. 1, multi-axial gyroscope 200 in FIG. 2 combines at least three individual axial gyroscopes 280-284 into a single device. Unlike in FIG. 1, in-plane gyroscopes 280 and 282 are oriented parallel to Y-axis 194 and X-axis 192, respectively, rather than being placed in a mirror image arrangement about a certain spatial axis. Gyroscope 284 is an out-of-plane Z-gyroscope oriented parallel to Y-axis 194.

In example in FIG. 2, in-plane gyroscope Y-gyroscope 280 and out-of-plane Z-gyroscope 284 are driven along X-axis 192, while in-plane gyroscope X-gyroscope 282 is driven along Y-axis 194. Y-gyroscope 280 is sensitive to deflections along Z-axis 196 for rotations about Y-axis 194; X-gyroscope 282 is sensitive to deflections along Z-axis 196 for rotations about X-axis 192; and Z-gyroscope 284 is sensitive to deflections along Y-axis 194 for rotations about Z-axis 196.

In one embodiment, the set of rotary joints 222 rotates about Z-axis 196 to create push-pull forces that transfer the motion of two sets of driving masses 202-208 and 212-218 in the Y-axis direction 194 to individual gyroscopes 280-284 located in the XY-plane so as to distribute the actuating driving force to each individual gyroscope 280-284. In a manner similar to FIG. 1, the system of masses 202-208 and 212-218 in FIG. 2 may be electrostatically actuated by electrodes to oscillate along Y-axis 194 and deliver the mechanical forces required to oscillate internal masses of gyroscopes 280-284.

In one embodiment, rotary joint 222 is coupled to at least to one of masses 202-218 or another rotary joint 222 and rotates about its respective center anchor 170 to generate pairs of antiphase motions along both X-axis 192 and Y-axis 194. The arrangement of joints 222 constrains the motion of the sets of driving masses 202-208, 212-218 to be synchronous and antiphase (e.g., when set 202-208 moves in negative direction along Y-axis 194, set 212-218 consistently moves in positive direction along Y-axis 194). The synchronous motion generates driving forces that enable the operation of shock-robust gyroscopes 280-284. For example, force 172 may drive four internal masses of shock-robust gyroscope 280, as shown in FIG. 2.

In one embodiment, the location denoted with numeral 286 in FIG. 2 may be used to hold a redundant X-gyroscope or Z-gyroscope that is not shown in FIG. 2. That location may also be used to hold dummy masses (also not shown), e.g., for the purpose of improving sensor symmetry about X-axis 192.

Figure 3:
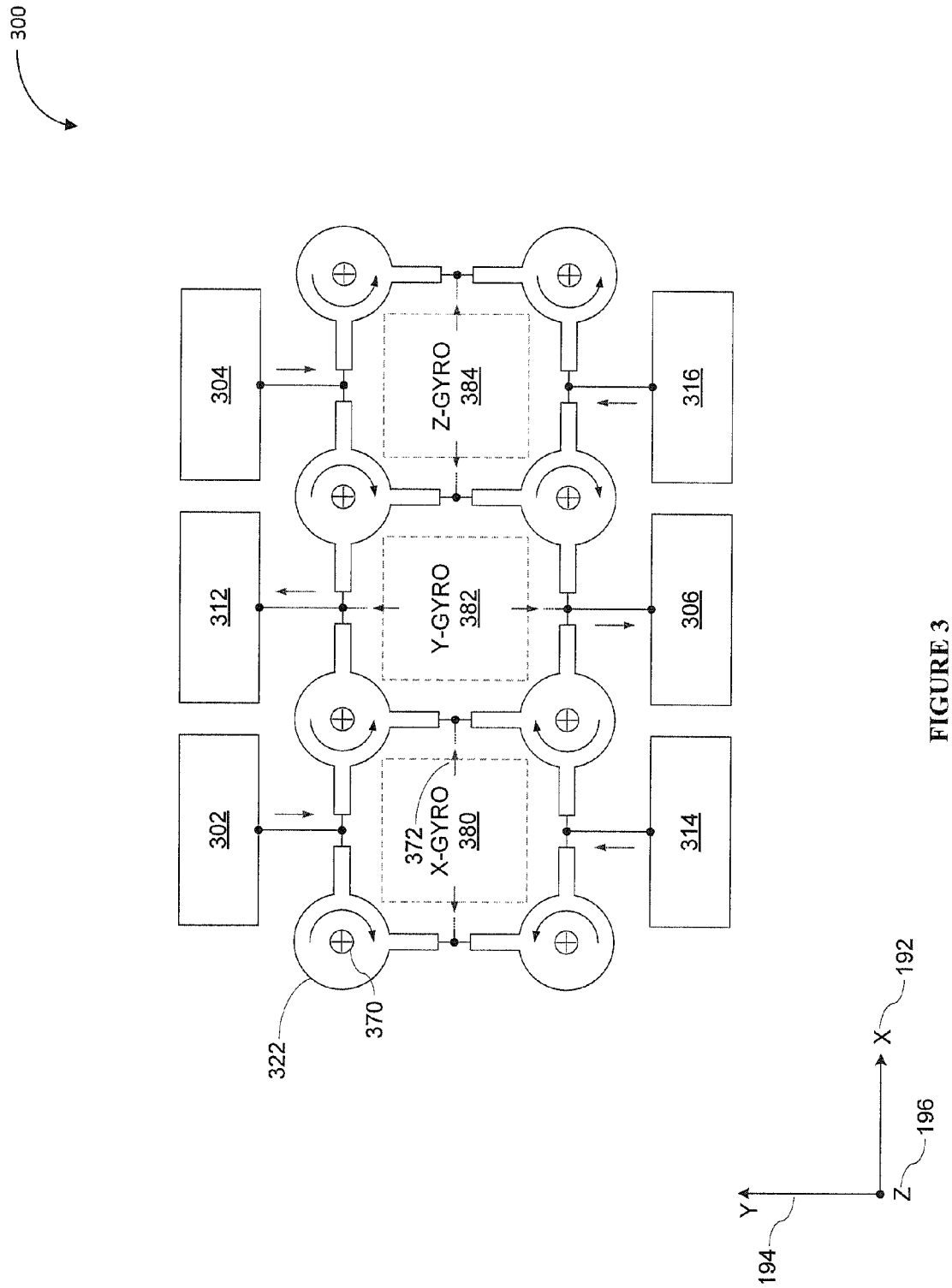
FIG. 3 is an illustration of an exemplary system of non-shock-robust gyroscopic sensors in a tri-axial gyroscope configuration driven by a single driving mechanism, according to various environment of the invention.

FIG. 3 is an illustration of an exemplary system of non-shock-robust gyroscopic sensors arranged as a tri-axial gyroscope and driven by a single driving mechanism, according to various environment of the invention. System 300 comprises in-plane gyroscopes 380 and 382 and out-of-plane Z-gyroscope 384. Similar to FIG. 2, gyroscopes 380 and 384 are oriented parallel to X-axis 192, while gyroscope 382 is oriented parallel to Y-axis 194. X-gyroscope 380 is sensitive to deflections along Z-axis 196 for rotations about X-axis 192; Y-gyroscope 382 is sensitive to deflections along Z-axis 196 for rotations about Y-axis 194; and Z-gyroscope 384 is sensitive to deflections along Y-axis 194 for rotations about Z-axis 196.

In one embodiment, a set of rotary joints 322 rotates about Z-axis 196 to create push-pull forces that transfer the motion of two sets of driving masses 302-306 and 312-316 in the Y-axis direction 194 to individual gyroscopes 380-384 located in the XY-plane so as to distributes the actuating driving force to each individual gyroscope 380-384. System of masses 302-316 may be electrostatically actuated by electrodes to oscillate along Y-axis 194 and deliver the mechanical forces to gyroscopes 380-384.

Again, each of rotary joint 322 is coupled to at least to one of masses 302-316 or another rotary joint 332 and rotates about its respective center anchor 170 to generate pairs of antiphase motions along both X-axis 192 and Y-axis 194. The arrangement of joints 322 constrains the motion of the sets of driving masses 302-306 and 312-316 to be synchronous and antiphase (e.g., when set 302-306 moves in negative direction along Y-axis 194, set 312-316 moves in positive direction along Y-axis 194).

In this example, only two forces 372 are required to actuate gyroscope 380, so that only two masses internal to gyroscope 380 are connected to joints 322. As a result, without more, this configuration would be insufficient to drive the number of masses required to operate the shock-robust gyroscopes shown in FIG. 1 and FIG. 2.

Figure 4:
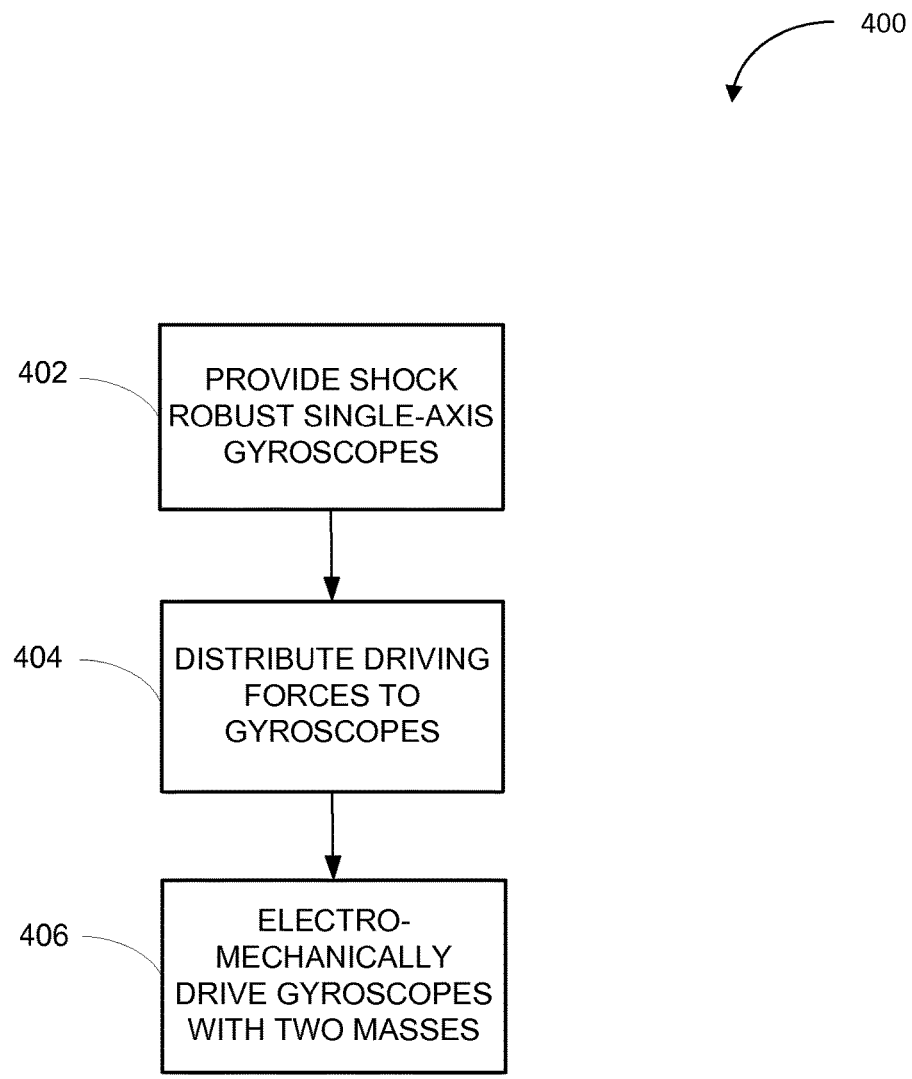
FIG. 4 is a flowchart of an illustrative process for shock cancellation in a multi-axis gyroscope configuration driven by a single driving mechanism, in accordance with various embodiments of the invention.

FIG. 4 is a flowchart of an illustrative process for shock cancellation in a multi-axis gyroscope configuration driven by a single driving mechanism, in accordance with various embodiments of the invention. The process for shock cancellation starts at step 402 by providing multiple shock-robust single-axis gyroscopes. The gyroscopes may be in-plane gyroscopes, out-of-plane gyroscopes or any combination thereof.

At step 404, driving forces are distributed to the shock-robust single-axis gyroscopes via a joint system, for example, a rotary joint system.

Finally, at step 406, the shock-robust single-axis gyroscopes are driven electro-mechanically by at least two masses, for example, by synchronous, antiphase motions as controlled by an external control system.

It will be appreciated by those skilled in the art that fewer or additional steps may be incorporated with the steps illustrated herein without departing from the scope of the invention. No particular order is implied by the arrangement of blocks within the flowchart or the description herein.

It will be further appreciated that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art, upon a reading of the specification and a study of the drawings, are included within the scope of the present invention. It is therefore intended that the claims include all such modifications, permutations, and equivalents as fall within the true spirit and scope of the present invention.

We claim:

1. A single-drive multi-axis MEMS gyroscope for detecting movements in an orthogonal coordinate system having X-, Y-, and Z-axes, the single-drive multi-axis MEMS gyroscope comprising:
axial gyroscopes comprising proof masses;
first and second sets of driving masses configured to be driven into oscillation relative to each other in a first driving direction that takes place along a first axis of the X-, Y-, and Z-axes; and
a set of joints connected to at least one of the first and second sets of driving masses to distribute driving forces of the first and second set of driving masses in the first driving direction, the set of joints is configured to transfer the oscillation and the driving forces of the first and second sets of driving masses in the first driving direction into driving forces that oscillate the proof masses of the axial gyroscopes in second driving directions, at least some of the second driving directions being at angles relative to the first driving direction, wherein each of the second driving directions is orthogonal to a respective sense direction of the axial gyroscope associated therewith, and each of the sense directions is orthogonal to a respective second axis of the X-, Y-, and Z-axes about which the axial gyroscope associated therewith detects rotation, such that in the event of a rotation about the respective second axis of any one of the axial gyroscopes, a Coriolis force is generated in the sense direction thereof.

2. The single-drive multi-axis MEMS gyroscope according to claim 1, wherein at least one of the axial gyroscopes is a single-axis shock-robust gyroscope.

3. The single-drive multi-axis MEMS gyroscope according to claim 1, wherein at least two of the axial gyroscopes are disposed in a mirror image arrangement about the first axis.

4. The single-drive multi-axis MEMS gyroscope according to claim 1, wherein the angle of at least one of the second driving directions is at positive 45 degrees to the first driving direction and the angle of at least another one of the second driving directions is at negative 45 degrees to the first driving direction.

5. The single-drive multi-axis MEMS gyroscope according to claim 1, wherein the angle of at least one of the second driving directions is at zero degrees to the first driving direction.

6. The single-drive multi-axis MEMS gyroscope according to claim 1, further comprising at least one of a redundant gyroscope and a dummy mass.

7. The single-drive multi-axis MEMS gyroscope according to claim 1, wherein the set of joints constrains motions of the first and second sets of driving masses to be antiphase, synchronous, and restricted to a single degree of freedom.

8. The single-drive multi-axis MEMS gyroscope according to claim 1, wherein the set of joints is anchored to a substrate at anchoring points to hold the set of joints onto the substrate and to enable rotary movements around the anchoring points.

9. The single-drive multi-axis MEMS gyroscope according to claim 1, wherein the set of joints comprises a first subset of joints connected to the first set of driving masses to synchronize the oscillations of the first set of driving masses with at least a first of the proof masses in a first gyroscope of the axial gyroscopes.

10. The single-drive multi-axis MEMS gyroscope according to claim 9, wherein the first subset of joints comprises two rotary joints connected to the first gyroscope, the two rotary joints enable at least first and second proof masses of the proof masses in the first gyroscope to move antiphase.

11. The single-drive multi-axis MEMS gyroscope according to claim 9, wherein the set of joints comprises a second subset of joints connected to the first set of driving masses to synchronize the oscillations of the first set of driving masses with at least a second of the proof masses in a second gyroscope of the axial gyroscopes.

12. The single-drive multi-axis MEMS gyroscope according to claim 11, wherein the second subset of joints is connected to the first set of driving masses in a mirror image arrangement about the first driving direction.

13. A system to drive a multi-axis MEMS gyroscope in an orthogonal coordinate system having X-, Y-, and Z-axes, the system comprising:
a driving element;
a multi-axis MEMS gyroscope comprising first and second driving masses coupled to the driving element, the driving element sets the first and second driving masses into an antiphase oscillation in a driving direction that takes place along a first axis of the X-, Y-, and Z-axes, the multi-axis MEMS gyroscope comprising:
a first set of joints configured to enable a proof mass in a first gyroscope to move at a first angle relative to a first spatial direction;
a second set of joints configured to enable a proof mass in a second gyroscope to move at a second angle relative to the first spatial direction;
a third gyroscope having a proof mass enabled to move at a third angle relative to the first spatial direction, wherein each of the first, second and third angles is orthogonal to a respective sense direction that, in turn, is orthogonal to a respective second axis of the X-, Y-, and Z-axes about which the first, second, or third gyroscope associated therewith detects rotation, such that in the event of a rotation about the respective second axis of any one of the first, second, or third gyroscopes, a Coriolis force is generated in the respective sense direction; and
a control system that controls an actuation of the driving elements via comb electrodes and detects displacements of the proof masses via plate electrodes.

14. The system according to claim 13, wherein the number of the driving masses is eight.

15. A method to drive a multi-axis MEMS gyroscope, the method comprising:
providing a plurality of single-axis gyroscopes;
distributing driving forces to the plurality of single-axis gyroscopes via a joint system;
electro-mechanically driving the plurality of single-axis gyroscopes to generate synchronous, antiphase motions; and
determining an angular acceleration with at least one of the plurality of single-axis gyroscopes.

16. The method according to claim 15, wherein at least one of the plurality of single-axis gyroscopes is a shock-robust gyroscope.

17. The method according to claim 15, wherein the synchronous, antiphase motions are generated by more than two masses.

18. The method according to claim 15, further comprising controlling the synchronous, antiphase motions by an external control system.

19. The method according to claim 15, wherein the plurality of single-axis gyroscopes comprises an in-plane gyroscope and an out-of-plane gyroscope.

20. The method according to claim 15, wherein the joint system is a rotary joint system.

* * * * *